United States Patent
Pellizzer et al.

(10) Patent No.: US 11,363,014 B2
(45) Date of Patent: Jun. 14, 2022

(54) METHOD AND SYSTEM FOR SECURELY AUTHENTICATING A USER BY AN IDENTITY AND ACCESS SERVICE USING A PICTORIAL CODE AND A ONE-TIME CODE

(71) Applicant: Xiid Corporation, Las Vegas, NV (US)

(72) Inventors: Guido Pellizzer, Lovere (IT); Federico Simonetti, Cupertino, CA (US)

(73) Assignee: Xiid Corporation, Las Vegas, NV (US)

( * ) Notice: Subject to any disclaimer, the term of this patent is extended or adjusted under 35 U.S.C. 154(b) by 96 days.

(21) Appl. No.: 16/866,171

(22) Filed: May 11, 2020

(65) Prior Publication Data

US 2020/0351264 A1  Nov. 5, 2020

(51) Int. Cl.
| | | |
|---|---|---|
| *G06K 5/00* | (2006.01) | |
| *H04L 9/40* | (2022.01) | |
| *G06K 7/14* | (2006.01) | |
| *G06Q 20/32* | (2012.01) | |
| *G06Q 20/40* | (2012.01) | |
| *G06Q 20/20* | (2012.01) | |
| *G06Q 20/10* | (2012.01) | |

(52) U.S. Cl.
CPC ........ *H04L 63/0853* (2013.01); *G06K 7/1413* (2013.01); *G06K 7/1417* (2013.01); *G06Q 20/1085* (2013.01); *G06Q 20/206* (2013.01); *G06Q 20/3276* (2013.01); *G06Q 20/40* (2013.01); *H04L 63/083* (2013.01); *H04L 63/0846* (2013.01); *H04L 63/0884* (2013.01)

(58) Field of Classification Search
CPC ............ G06Q 20/3276; G06Q 20/1085; G07F 19/204; G07F 19/207
USPC ......................................... 235/379, 380, 382
See application file for complete search history.

(56) References Cited

U.S. PATENT DOCUMENTS

| | | | | |
|---|---|---|---|---|
| 9,992,187 B2* | 6/2018 | Lu | ......................... | H04L 63/061 |
| 10,325,087 B1* | 6/2019 | Goodsitt | ................. | G06F 21/32 |
| 2007/0295805 A1* | 12/2007 | Ramachandran | ....... | G07F 19/20 |
| | | | | 235/379 |
| 2012/0047070 A1* | 2/2012 | Pharris | .................. | H04M 17/20 |
| | | | | 705/43 |
| 2012/0173311 A1* | 7/2012 | Chang | ................ | G06Q 30/0241 |
| | | | | 705/14.1 |
| 2013/0124411 A1* | 5/2013 | Kobres | ................... | G07F 19/20 |
| | | | | 705/43 |
| 2017/0180351 A1* | 6/2017 | Lu | ......................... | H04L 67/146 |
| 2019/0108731 A1* | 4/2019 | Hazard | ............. | G06Q 20/1085 |
| 2020/0074442 A1* | 3/2020 | Kulkarni | ............ | G06Q 20/4097 |
| 2020/0302755 A1* | 9/2020 | Edwards | ................... | G06K 9/82 |

OTHER PUBLICATIONS

U.S. Appl. No. 62/831,507, Guido Pellizzer.

* cited by examiner

*Primary Examiner* — Daniel St Cyr
(74) *Attorney, Agent, or Firm* — Jordan Powell

(57) ABSTRACT

The present invention comprises scanning, by a mobile device of the user, a QR code generated by a server application when the user requests access to a secure web portal and generating, within a client application, a login code which is used to authenticate the user within an authentication service and then being redirected to the requested portal.

23 Claims, 4 Drawing Sheets

METHOD AND SYSTEM FOR SECURELY AUTHENTICATING A USER BY AN IDENTITY AND ACCESS SERVICE USING A PICTORIAL CODE AND A ONE-TIME CODE

BACKGROUND

This invention relates to authentication and verification in a computing environment and in particular to generating offline a unique ID for a user desiring to authenticate with a secure web server. In the context of this document a "user" can refer to a person, a process, a software, a device, and/or an application programming interface (API).

Traditional authentication methods require a user of a computer system to log into an authentication routine of the computer system by first specifying the username of that particular user, and do this each time the user logs in. Once the authentication routine has recognized the username as one that is registered with the identity database that is supported by the authentication routine, the authentication routine then requests additional forms of verification. Probably the most common and traditional additional verification form is a password. Essentially anyone who has utilized a modern computer system is familiar with the username/password form of authentication/login.

Another concept related to computing systems, including banking, online purchasing, registration of personal information, etc., that essentially all users of computers recognize is computer hacking, or in other words, circumventing security installed on computing systems in order to obtain, without permission, the information contained behind the security layer.

Password-based authentication discussed above is a weak means of authentication for the purpose of protecting data behind the security layer, which security layer is often a combination of protection devices and methods such as a firewall, an authentication procedure, and oftentimes intrusion detection and prevention tools. Hackers utilize their skills in computers to steal user names and passwords in order to pierce firewalls and other security measures, devices, applications and procedures, and steal information. It is common to hear in the news that corporations/businesses having significant user information have been hacked and personal data is lost to elements seeking to steal personal identities. Once passwords have been obtained for such businesses the hacker can impersonate a user and obtain secured data. Similarly, users will have their computers hacked and passwords stolen putting their identities and financial information at risk. Many schemes are utilized to strengthen passwords but even strong passwords can be hacked.

Clearly there is a need to provide a method of user identification using a highly secure user ID that, for ease of use by the user, does not require a user to specify either the user's username or password, and where the unique ID changes at each authentication/verification occurrence, or the changes are time-based with time windows composed of a variable number of seconds.

SUMMARY

According to a preferred embodiment of the present invention a user, utilizing the user's mobile device, scans a QR code received at the user's computing device from a web server, and the mobile device generates login credentials and automatically sends the login credentials to the web server which then authenticates the user with an authentication system.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

The provisional patent application filed May 2, 2019 having U.S. Ser. No. 62/842,261 entitled A Method and System for Securely Authenticating a User by an Identity and Access Service Using a Pictorial Code and a One-Time Code and having the same inventors and assignees is hereby incorporated in its entirety by reference.

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the claimed invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." "Fig" or "FIGs." herein) of which:

DETAILED DESCRIPTION

While some embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

For purposes of this invention, IAS is an abbreviation for identity and authentication service. IAS is a system or software that provides identification of users, authentication, and other related services.

Figure 1:
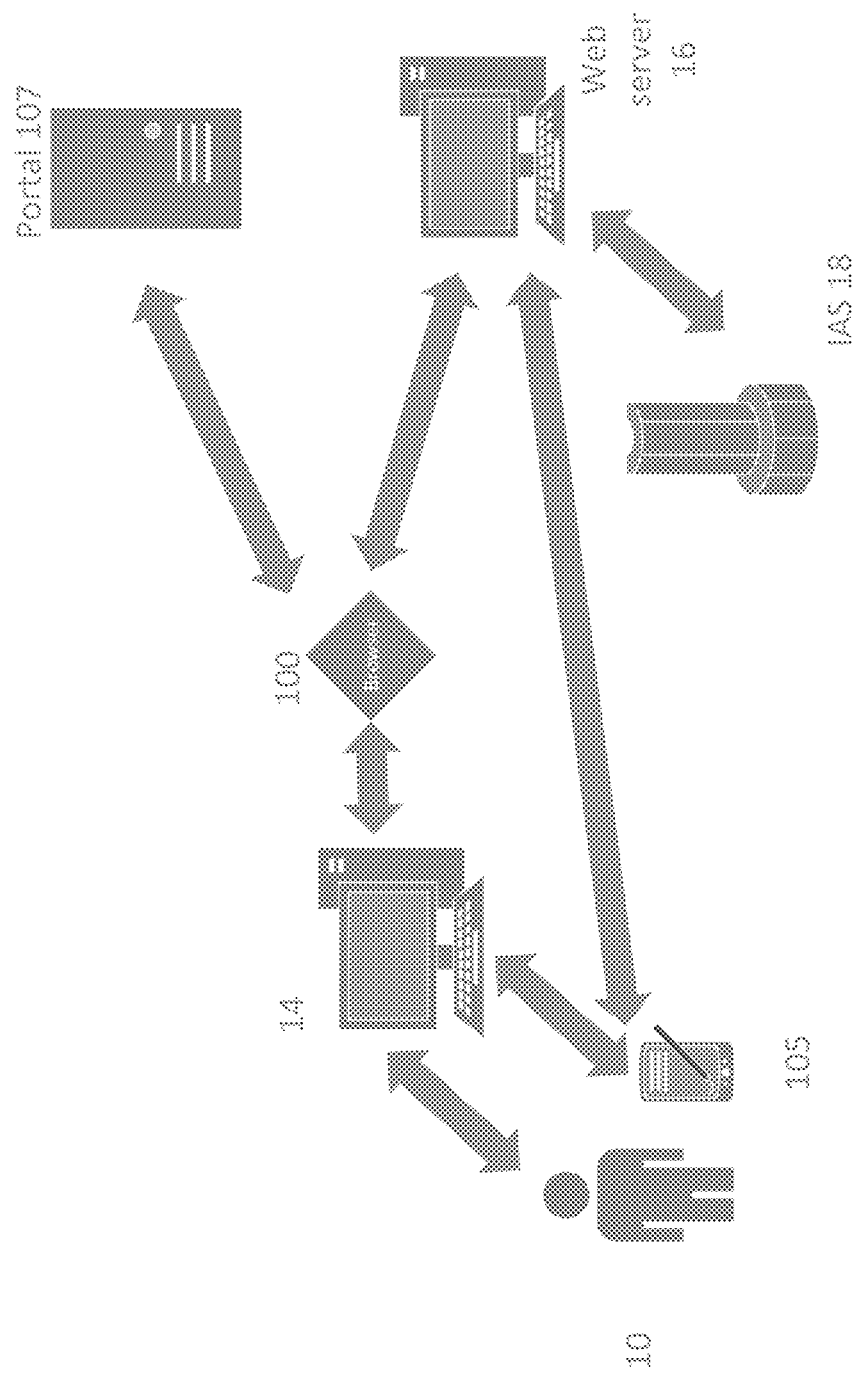
FIG. 1 illustrates an example of a system where a user authenticates with an authentication system and accesses an associated resource pursuant to a second embodiment of the present invention.

Reference is now made to FIG. 1. FIG. 1 shows a client application, which in the preferred embodiment of the present invention is web browser 100 and is part of computing device 14. Throughout the following explanation of the present invention the term "web browser" should be understood as one case of the broader concept of a client application but in the preferred embodiment the client application is a web browser on computing device 14. FIG. 1 further shows web server 16 connected to the web browser 100, a mobile device 105 having a connection to a server application, which in the preferred embodiment of the present invention is web server 16, and portal 107 which a user 10 desires to access. FIG. 1 also shows IAS 18 connected to web server 16. As with the client application/ web browser 100, the following explanation of the present invention will use the term "web server" in the preferred embodiment but should be understood as the broader concept of a server application.

Figure 2:
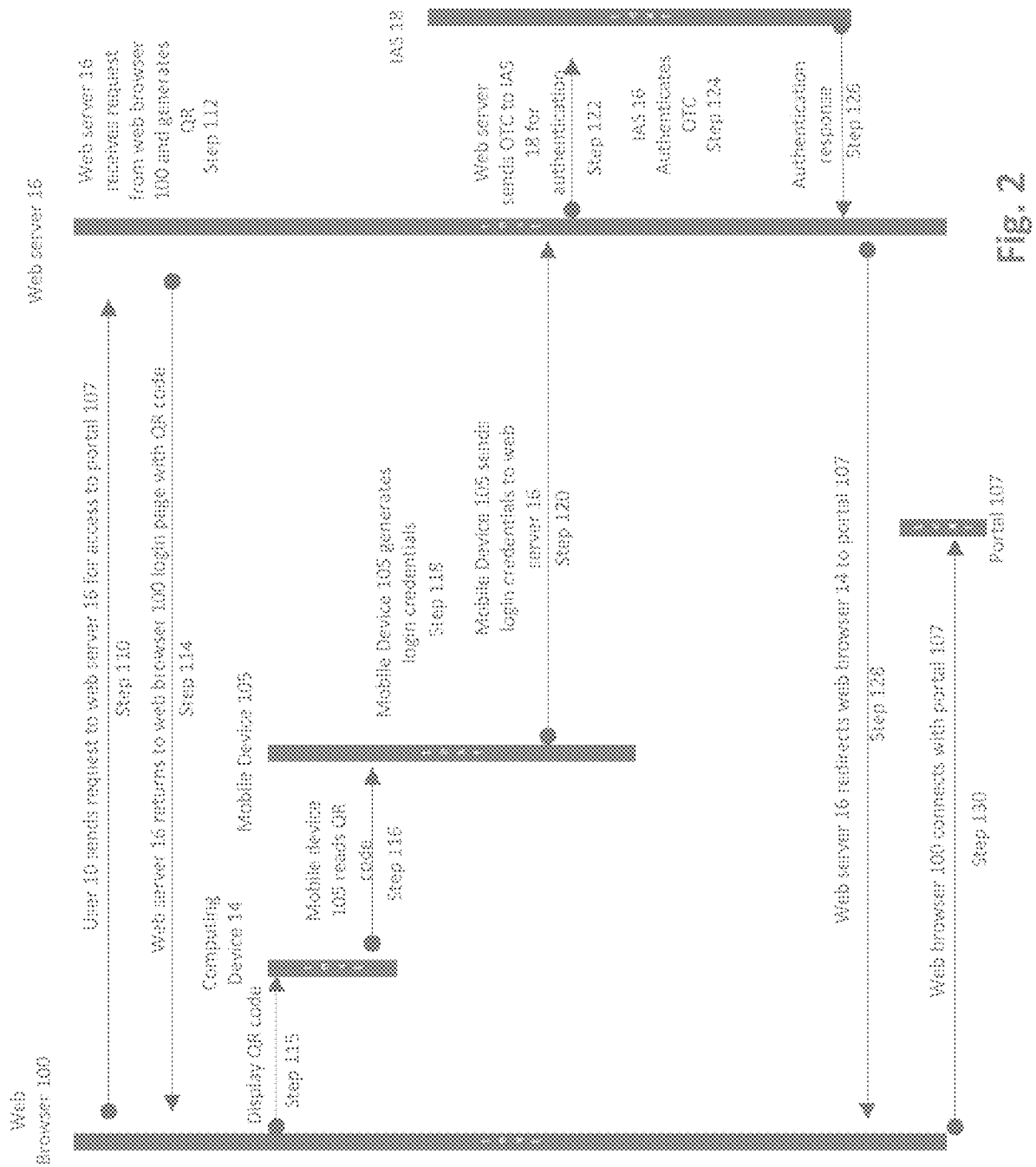
FIG. 2 illustrates a flow diagram where a user authenticates with an authentication system and access an associated resource pursuant to the second embodiment of the present invention.

With reference to the diagram of FIG. 1 and the flow diagram of FIG. 2, user 10 sends a request to web server 16 for access to portal 107 (step 110). It will be noted that web server 16 is the the authentication "gate keeper" for access to the services of portal 107.

As mentioned above, authentication pursuant to the prior state of the art required a user to enter a username followed by a password. In many cases, a one-time password ("OTC") was generated by a token which was entered with the username and password in an attempt to further supply security in the authentication process. An OTC is a code identifying a user that can only be used once, or for a certain predetermined amount of time. Any attempts to reuse the same code will result in an unsuccessful user verification.

In the preferred embodiment of the present invention, user 10 is not required to input a username and password for authentication, thus making the authentication process easier, user friendly and significantly more secure.

Referring again to FIGS. 1 and 2, upon receiving the request from web browser 100 for access to portal 107, web server 16 generates a response which is a login page (step 112). The login page includes an encoded symbol such as a pictorial code or matrix barcode. Other coded symbols, letters and/or numbers are contemplated within the scope of the present invention as a substitute for the matrix barcode.

One having ordinary skill in the art will recognize that a common matrix barcode which can be utilized by the present invention is a Quick-Response, or QR, code which is usually processed by a Reed-Solomon error correction. Given the common usage of the QR code, the preferred embodiment of the present invention will be described utilizing a QR code as the coded symbol, or matrix barcode, utilized in the authentication process being described.

At step 114, web server 16 returns to the web browser 100 the login page which includes the generated QR code and instructions to be used by web browser 100 to refresh the QR code. The QR code includes a globally/universal random unique identifier (hereafter "unique identifier"). This is important because with the unique identifier, no two QR codes can ever be the same at the same time. By utilizing QR codes having unique identifiers one can be certain that the QR code presented to user 10 in web browser 100 is valid for web browser 100 only and not utilized, at that moment in time, by any other user, web browser or computer. One having ordinary skill in the art will recognize that all QR codes displayed to users are unique and different. It is noted that unique identifiers are well know in the art and the various processes for generating such are well documented. The QR code may or may not contain additional information that the web server 16 or portal 107 may deem necessary to send to the user's 10 browser 100.

The QR code is only valid for a given period of time, and in the preferred embodiment of the present invention, the time for validity of the QR code is sixty (60) seconds. Note that the time for refreshing is an arbitrary number chosen by the developer of the portal 107. After the valid period of time, web browser 16 automatically refreshes the QR code. The timed refreshing of the QR code is important in order to maintain the security of the authentication process.

At step 115 computing device 14 will display the QR code received by web browser 100 from web browser 16. Display of the QR code can be done in any manner by computing device 14 so long as the QR code can be "read" or scanned by mobile device 105.

It should be noted at this point that mobile device 105 has a mobile app ("authentication program 1") loaded onto mobile device 105 that is compatible with the authentication software which is loaded onto IAS 18. In particular, mobile device 105 contains part of a two-part authentication software process. Specifically, mobile device 105 contains personal and/or private information or login credentials that include username and password that user 10 utilizes to authenticate with IAS 18. Mobile device 105 also contains the mobile app (authentication program 1) necessary to generate a login code containing the login credentials that is acceptable to IAS 18 as will be described subsequently. Mobile device 105, in this embodiment, is specific to user 10 and contains personal and/or private information of user 10, namely usernames and passwords, which are preferably protected in mobile device 105 through encoding, biometrics and/or other means of protecting/encrypting such data.

At step 116 user 10 scans the QR code from computing device 14 using mobile device 105. Mobile device 105 is understood to have the software necessary to scan and decode the QR code. Mobile device 105 can be understood to be, in the this embodiment, a mobile phone or tablet owned by user 10 but is not limited to these two examples.

The encoded symbol generated by web browser 16 and included in the response to browser 100 has been described in the preferred second embodiment of the present invention as a QR encoded symbol which is uploaded to mobile device 105 by scanning the QR code. Other codes generated by web browser 16 and uploaded, through various means, to mobile device are contemplated by the present invention. For instance, a code, not necessarily encoded symbol, may be part of the response which is uploaded to mobile device 105 through means such as near-field connection (NFC), bluetooth, or other wireless or wired connections between computing device 14 and mobile device 105. However, assuming mobile device 105 is separate from web browser 100, scanning a QR code is the method utilized in the preferred embodiment. This is the case because it provides excellent security. If a wireless method of inputting the code into mobile device 105 is utilized there is a chance that the wireless transmission could be compromised by a nearby party "snooping" in on wireless transmissions. Taking an image of a QR code with a camera or other comparable device assures that the in-take of the QR code to the mobile device 105 is done securely, particularly because the QR code is refreshed at frequent intervals so cannot be readily hacked/stolen. Where wireless transmissions can be assured to be secure then such can be substitutions for the QR code depending upon the software and system design. For the preferred embodiment the QR code is utilized.

It is noted that mobile device 105 may be the device upon which browser 100 is loaded and which user 10 sends the request to web server 16 for access to portal 107. In this case, web server 16 sends the code or encoded symbol in the response directly back to mobile device 105. Accordingly, mobile device 105 will have direct access to the code or encoded symbol and does not need to upload such code/encoded symbol from another device such as computing device 14.

For ease of explanation, the description of the preferred embodiment will describe the QR code sent to computing device 14 and uploaded to mobile device 105, but all other methods, such as has been explained previously, are contemplated within the present invention.

Having scanned and decoded a valid QR code from computing device 14, at step 118 mobile device 105 utilizes the QR code from web server 16 and user 10's personal and/or private information stored in mobile device 105 to generate a login code that will be recognized and accepted by web server 16, and subsequently IAS 18, as appropriate login credentials. Mobile device 905 generates the login code using the mobile app (authentication program 1) mentioned above that is loaded onto mobile device 105.

For additional security, and pursuant to the present invention, the login code generated by the mobile app on mobile device 105 is an OTC. In this case, mobile device 105 operates as a one-time code producer ("OTCP") similar to a token generator of OTC's. For purposes of generating the OTC, reference is made to the provisional patent application filed Oct. 29, 2018 having U.S. Ser. No. 62/751,859 ('859) entitled Username-less and Password-less One-Time Identification and Authentication Code Method and System and having the same inventors and assignees. The '859 is hereby incorporated in its entirety by reference. Accordingly, mobile device 105 generates the OTC according to the method described in '859. Other methods of generating the OTC may be utilized in the practice of the present invention and are therefore contemplated herein, but the '859 describes a method that is highly secure and considered superior to other methods, particularly with regards to the preferred embodiment of the present invention.

Scanning/reading the QR code by mobile device 105 allows mobile device 105 to extract the unique identifier contained in the QR code.

At step 120 mobile device 105 sends the login code, which includes the OTC generated by mobile device 105 and the unique identifier, to web server 16. In the preferred embodiment mobile device 105 automatically sends the login code to web server 16 without any action from user 10. Other methods of sending the login code are considered in the present invention including the case where user 10 affirmatively controls mobile device 105 to send the login code such as actively engaging a "send" button or actuator of mobile device 105.

Upon receipt of the login code, web server 16 retains the unique identifier but sends to IAS 18 the OTC received from mobile device 105 (step 122)

At step 124 IAS 16 authenticates the OTC received from mobile device 105. The authentication is carried out by an application loaded onto IAS 16 which is the second part of the 2-part authentication software system and will be referred to hereafter as "authentication program 2." The process for authenticating the OTC within IAS 18 is preferably described in the '859 application but other methods may be utilized in the practice of the present invention.

It is important to note that authentication program 1 and authentication program 2 are designed to work together to authenticate users that are authorized to be authenticated by IAS 18. Therefore, a user desiring authentication in IAS 18 will understand what authentication software is required for authentication in IAS 18 and load the appropriate app/software onto mobile device 105. Thus, mobile device 105 can generate the appropriate login code using the QR code (or other code as described above) sent from web server 16 in step 114 and the OTC generated in mobile device 105 in step 118. An appropriate login code is one that can be authenticated by IAS 18. Having authenticated user 10 from the OTC generated by mobile device 105, IAS 18 sends to web browser 100 an authentication response at step 126.

In the event the login code is not authenticated by IAS 18, IAS 18 notifies web browser 16 of the failed authentication and web browser 16 so notifies web browser 100. For purposes of describing the preferred embodiment of the present invention, it is assumed that an appropriate login code has been sent from mobile device 105 and that IAS 18 has authorized the OTC received therefrom.

At step 128, web server 16 sends a session token to web browser 100 redirecting web browser 100 to port 107 which user 10 desires to access. The session token from web server 16 contains a unique session authorization code generated by IAS 18 (and sent in the authorization response from IAS 18 to web browser 16 in step 126) which allows user 10 access to portal 107.

Note at this point that web server 16 needs to know to which specific browser to send the session token after authorization. Web server 16 is able to infer the proper browser (namely web browser 100) from the unique identifier described above which was sent initially from web server 16 to web browser 100 in the QR code. This unique identifier therefore has circled through the entire process of authentication described with respect to the present invention. In this manner the proper unique identifier has been sent to the web browser 100 from web server 16, has been part of the creation of the login code, then sent with the login code for authentication back to web server 16 and finally utilized to connect the appropriate browser (web browser 100) to portal 107 through the redirect command containing the identifier in its payload with the newly generated session token.

At step 126 web browser 100 connects with portal 107 utilizing the unique session session token received from web server 16.

Although the process and steps for authentication pursuant to this embodiment just described are complex and involve information and software apps in multiple devices, to a user the process is quite easy and straight forward. From user 10's perspective, user 10 sends the request for access to portal 107 from web browser 100 to web server 16. Upon receiving back from web server 16 the QR code, user 10 simply scans the QR code using authentication program 1 on user 10's mobile device 105. After a short period of time and assuming user 10 has the appropriate login credentials, user 10 will be redirected to the portal 107 that user 10 desires to access and which was identified in user 10's initial request to web server 16. If web browser 100 is resident on mobile device 105 the process can be made easier for user 10.

One having ordinary skill in the art will recognize that the authentication process described with regards to FIGS. 1 and 2 can be utilized by many different applications created by many different companies/developers. One particular application of the process described with regards to FIGS. 1 and 2 for authentication program 1 that works particularly well with the present invention is XiidID™ created, owned and protected by Xiid Corporation.

Applications of the Present Invention

The above description with respect to the present invention describes the general concept of the operation of the present invention. Following are descriptions of applications for the present invention.

ATM

Figure 3:
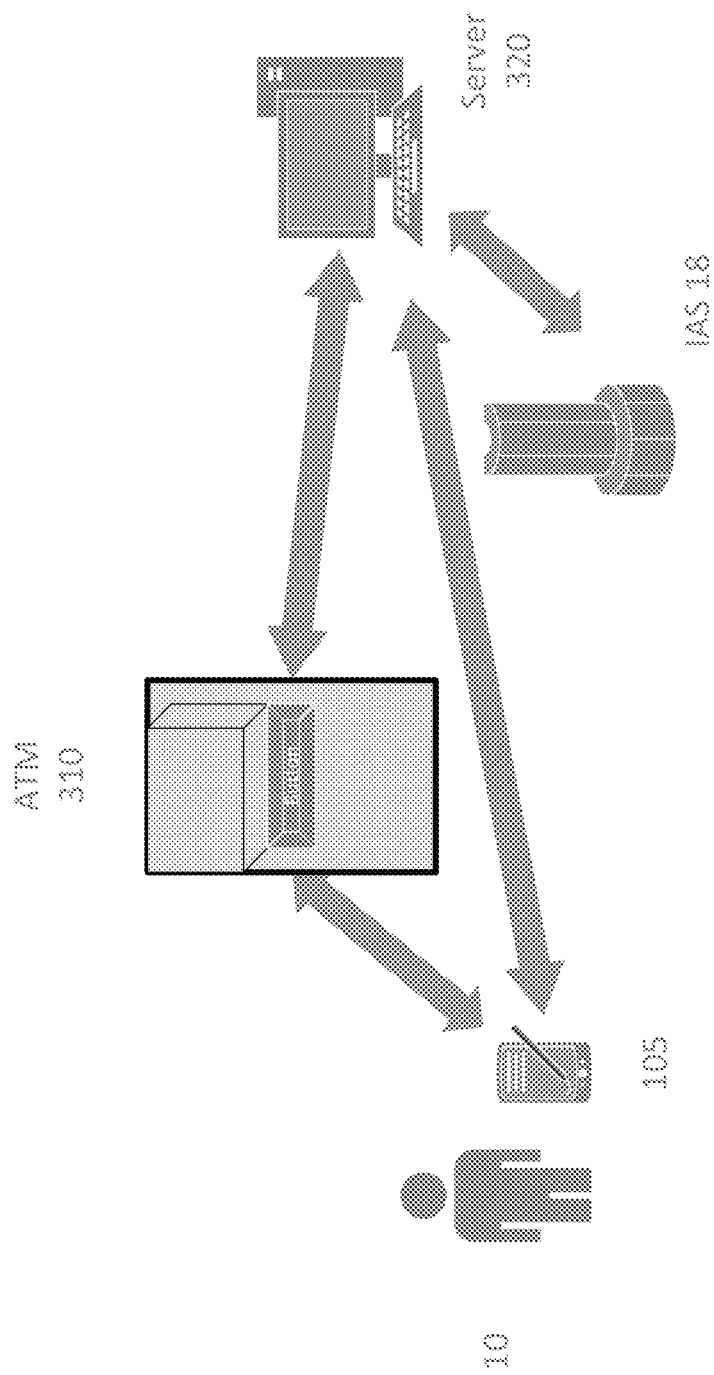
FIG. 3 illustrates an example of a system for an ATM where a user initiates authentication through a user interactive unit of the ATM and accesses an associated resource

Reference is now made to FIG. 3. FIG. 3 shows user 10 with mobile device 105 similar to that shown in the description for FIG. 1 and FIG. 2. In this case, ATM 310 acts as the computing device 14, or user interactive unit, and the client application/web browser 100 is incorporated in the user interactive unit. Similarly, server 320 acts as server application/web server 16 and portal 107 combined. As with FIG. 1, IAS 18 is utilized for authentication.

Figure 4:
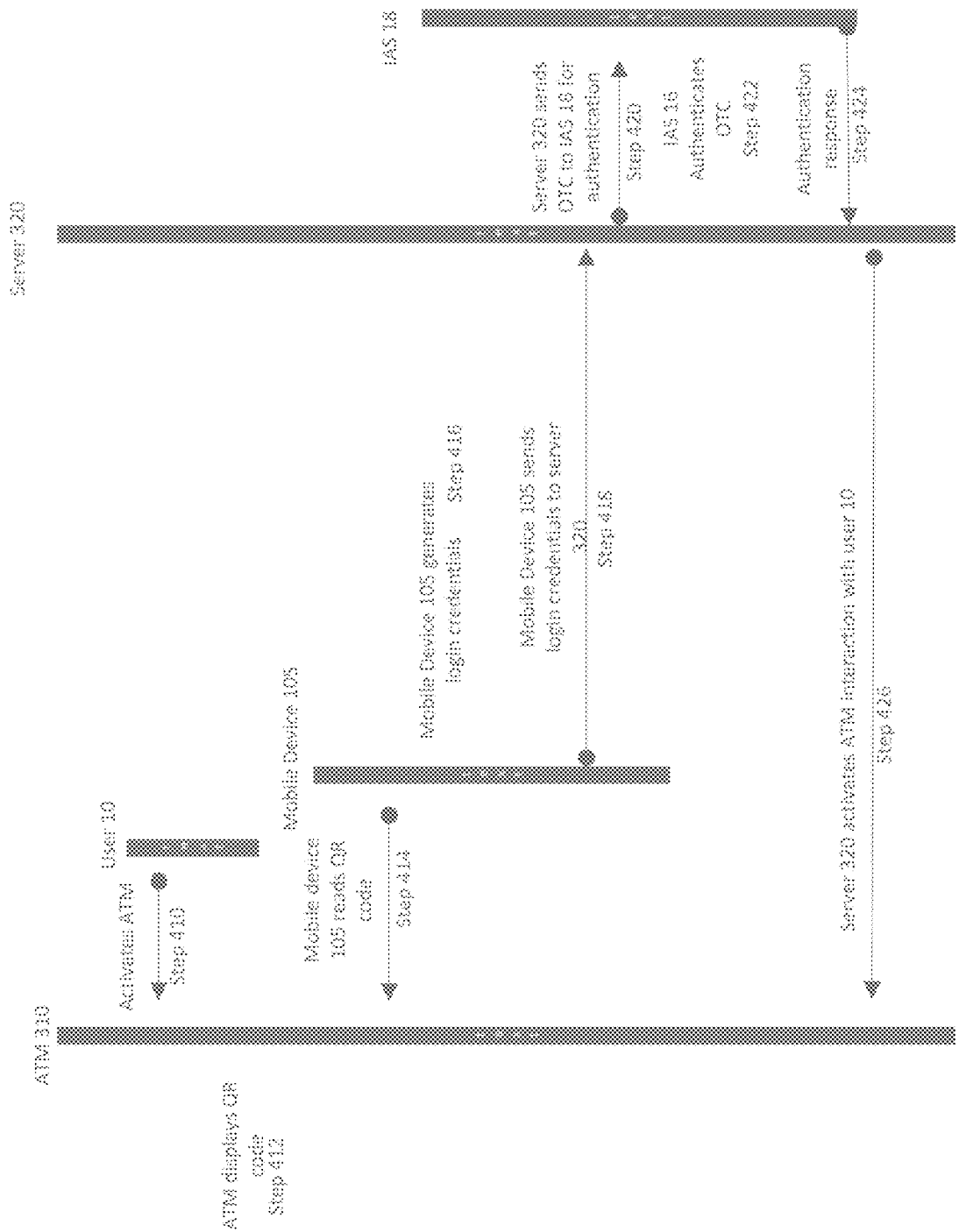
FIG. 4 illustrates a flow diagram of the ATM example of FIG. 3.

FIG. 4 outlines the flow of the present invention when implemented in an ATM system as shown in FIG. 3. The flow of the ATM system will be described with reference to both FIG. 3 and FIG. 4.

At step 410 a user will activate ATM 310. This will be done through a user interactive unit, such as the screen on the ATM 310 which the user interacts with, which will allow ATM 310 to recognize that a user is there. It is understood that this ATM activation step is optional and in fact an ATM may very well be always active and constantly refreshing QR codes on its monitor, unused QR codes do not harm nor interfere with the proper operation of this method anyway. In addition, the action by user 10 will indicate to ATM 310 that user 10 desires to securely log in pursuant to the methods described by the preferred embodiment of the present invention rather than requiring user 10 to enter a user name and password; in absence of a user 10 action, the scanning of the QR code by the user's mobile device 105 will imply the user 10's desire to log in.

Pursuant to the present invention, ATM 310 generates and displays a unique QR code at step 412. As mentioned above, the QR code is valid for a short period of time. With the QR code displayed by ATM 310, user 10 scans the QR code using mobile device 105 as described above (step 414). At this stage mobile device 105 generates (step 416) the appropriate login code using the information gathered from the QR code. Mobile device 105 will have the authentication program 1 which generates the login code, which as described above, is an OTC.

Having generated the OTC, mobile device 105 sends the login code or OTC to the server 320 at step 418. At step 420, server 320 sends the OTC to IAS 18 for authentication. Upon authentication at step 422, IAS 18 returns an authentication response to server 320 at step 424.

Having received authentication confirmation for user 10 from IAS 18, server 320 activates ATM 310 with user 10's account information at step 426 which allows user 10 to then operate ATM to retrieve money or manage user 10's account.

Filling Stations

Another application of the present invention which is quite similar is with fuel filling stations. The process is essentially the same where instead of ATM 310, the user interactive unit is a fuel filling pump screen.

Point of Sale (PoS)

Another application is a point-of-sale (PoS). The PoS application is very similar to that of the ATM and Filling Station applications with a small modification. Similar to that of the ATM, the PoS is a user interactive unit and presents a QR code (or other pictorial code) at the time of checking out. Normally a register of some type will track items which user 10 is purchasing. Upon completing the list of items to be purchased, the PoS display will display the QR code which is scanned by user 10's mobile device 105. The process for authentication proceeds as with the other applications and as described for the preferred embodiment. Server 320 will send the authentication response to the client software running on the PoS, which will finalize the payment process.

Various examples have been explained to help establish the utility of the preferred embodiment of the present invention. These examples are certainly not limiting as there are many possible uses for the present invention. For instance, the present invention may be utilized for any automated financial transaction/payment requiring secure login where user interactive units incorporating the client application are utilized for the financial transactions. The present invention may further be utilized for physical and/or virtual access to secure locations, secure access to data storage, and secure access to transportation of various kinds including automobiles, trains, airplanes or whatever transportation units are developed in the future. All of these would have user interactive units where the units incorporate the client application. Communications and communication devices, both secure and/or those requiring financial transactions, would also utilize the present invention where, again, the user interactive unit would incorporate the client application.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned Detailed Description, the descriptions and illustrations of the preferred embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A method for secure authentication by a user comprising: the user sending a request from a client application to a server application requesting access to a portal; generating, in the server application, a random unique identifier and transmitting the random unique identifier in an encoded symbol from the server application to the client application; receiving, by the client application, the encoded symbol; uploading the encoded symbol from the client application by a mobile device of the user; generating, in the mobile device, a one-time authentication code (OTC) utilizing a secret code, wherein the secret code is a pseudo-random code, a random code, or generated codes, generated in an authentication server during an initialization phase of the mobile device; generating a login code using the OTC and the random unique identifier from the encoded symbol; transmitting the login code from the mobile device to the authentication server; the authentication server authenticating the user using the login code, wherein the user is not required to input a username and password for authentication; and the authentication server redirecting the client application to the portal and allowing the client application to connect with the portal.

2. The method for secure authentication by a user according to claim 1 wherein the encoded symbol is a matrix barcode and the mobile device uploads the matrix barcode by reading the matrix barcode when the matric barcode is displayed from the client application.

3. The method for secure authentication by a user according to claim 2 wherein the matrix barcode is a QR code.

4. The method for secure authentication by a user according to claim 1 wherein the encoded symbol is valid for a given period of time.

5. The method for secure authentication by a user according to claim 4 wherein the given period of time is sixty seconds.

6. The method for secure authentication by a user according to claim 1 wherein the secret code is one of a random code, a pseudo-random code or other generated code.

7. The method for secure authentication by a user according to claim 6 wherein the OTC can only be used once.

8. The method for secure authentication by a user according to claim 6 wherein the further includes one of a HMAC one-time password (HOTP) or a time-based one-time password (TOTP).

9. The method for secure authentication by a user according to claim 7 wherein the authentication server is an identity and authentication server ("IAS").

10. The method for secure authentication by a user according to claim 9 wherein the OTC is utilized by the IAS to authenticate the user.

11. A method for authenticating a user with an ATM system comprising: uploading into a mobile device of the user a random unique identifier in an encoded symbol displayed by the ATM; the mobile device generating a one-time authentication code (OTC) utilizing a secret code, wherein the secret code is a pseudo-random code, a random code, or generated codes, generated in an authentication server during an initialization phase of the mobile device; generating, in the mobile device, a login code using the OTC and the random unique identifier from the encoded symbol; transmitting the login code from the mobile device to the authentication server; the authentication server authenticating the user using the login code, wherein the user is not required to input a username and password for authentication; and the authentication server allowing the ATM to be operated by the user.

12. The method for secure authentication by a user according to claim 11 wherein the encoded symbol is a matrix barcode and the mobile device uploads the matrix barcode by reading the matrix barcode when the matric barcode is displayed by the ATM.

13. The method for secure authentication by a user according to claim 12 wherein the matrix barcode is a QR code.

14. The method for secure authentication by a user according to claim 11 wherein the encoded symbol is valid for a given period of time.

15. The method for secure authentication by a user according to claim 11 wherein the secret code is one of a random code, a pseudo-random code or other generated code.

16. The method for secure authentication by a user according to claim 15 wherein the OTC can only be used once.

17. The method for secure authentication by a user according to claim 15 wherein the further includes one of a HMAC one-time password (HOTP) or a time-based one-time password (TOTP).

18. A system to securely authenticate a user comprising: an authentication server; an interactive unit communicating with the authentication system which the user desires to interact with; a mobile device of the user; wherein the interactive unit displays a random unique identifier in an encoded symbol; the mobile device uploads the encoded symbol into the mobile device; the mobile device generates a one-time authentication code (OTC) utilizing a secret code, wherein the secret code is a pseudo-random code, a random code, or generated codes, generated in the authentication server during an initialization phase of the mobile device, and further generates a login code using the OTC and the random unique identifier from the encoded symbol; the authentication server receiving the OTC from the mobile device; and the authentication server allowing the user to interact with the interactive unit when the authentication server authenticates the OTC, wherein the user is not required to input a username and password for authentication.

19. The system to securely authenticate a user according to claim 18 wherein the encoded symbol is a QR code.

20. The system to securely authenticate a user according to claim 18 wherein the encoded symbol is valid for a given period of time.

21. The system to securely authenticate a user according to claim 18 wherein the secret code is one of a random code, a pseudo-random code or other generated code.

22. The system to securely authenticate a user according to claim 18 wherein the OTC can only be used once.

23. The system to securely authenticate a user according to claim 22 wherein the further includes one of a HMAC one-time password (HOTP) or a time-based one-time password (TOTP).

* * * * *